United States Patent [19]

Beecherl et al.

[11] Patent Number: 6,149,561
[45] Date of Patent: Nov. 21, 2000

[54] MACHINE AND METHOD FOR FLEXIBLE LINE BORING

[75] Inventors: Peter M. Beecherl, Shelby Township; Donald D. Pagels, Sr., Warren; Ali M. Saeedy, Royal Oak; Philip S. Szuba, Clinton Township, all of Mich.

[73] Assignee: Unova IP Corp, Woodland Hills, Calif.

[21] Appl. No.: 09/268,828

[22] Filed: Mar. 16, 1999

[51] Int. Cl.⁷ .......................... B23Q 3/157; B23B 41/12
[52] U.S. Cl. .............................. 483/1; 408/1 R; 408/708; 483/13; 483/30
[58] Field of Search ................................... 483/1, 13, 30, 483/31; 408/1 R, 708, 238, 705

[56] References Cited

U.S. PATENT DOCUMENTS

| | | | |
|---|---|---|---|
| 4,657,446 | 4/1987 | Flaten | 408/708 X |
| 4,693,642 | 9/1987 | Mair et al. | 408/708 X |
| 4,697,318 | 10/1987 | Wickham et al. | |
| 4,711,016 | 12/1987 | Genschow et al. | |
| 4,789,279 | 12/1988 | Rottler | 408/708 X |
| 4,797,991 | 1/1989 | Yamaguchi et al. | |
| 5,321,874 | 6/1994 | Mills et al. | |
| 5,361,485 | 11/1994 | Baudermann | 408/708 X |
| 5,368,539 | 11/1994 | Mills et al. | |
| 6,013,016 | 1/2000 | Irvine et al. | 483/1 |

FOREIGN PATENT DOCUMENTS 63-185505  8/1988  Japan .

OTHER PUBLICATIONS

U.S. application No. 08/837,650, Irvine et al., filed Apr. 23, 1997.

U.S. application No. 09/130,873, Szuba et al.

*Primary Examiner*—William Briggs
*Attorney, Agent, or Firm*—Reising, Ethington, Barnes, Kisselle, Learman & McCulloch, P.C.

[57] ABSTRACT

A line boring apparatus comprising a motorized spindle and tool support mounted on a support frame for motion along two axes perpendicular to a rotational spindle axis. The spindle is also supported for motion along the spindle axis relative to the tool support. A tool cradle is supported beneath the spindle on the support frame and stores boring bars of differing outside diameters equipped with support bushings having outside diameters equal to an inner diameter of the tool support. A CNC is programmed to actuate an axes drive to cause the spindle to select a boring bar and bushing from the cradle. The CNC and axes drive then move the bar and bushing to a predetermined boring position axially aligned with an interrupted line bore to be machined in a workpiece. The CNC then commands the spindle to advance axially toward the tool support, removably engaging the bushing in the tool support and continuing to push the boring bar through the engaged bushing while rotating the bar and boring the interrupted line bore in the workpiece.

32 Claims, 7 Drawing Sheets

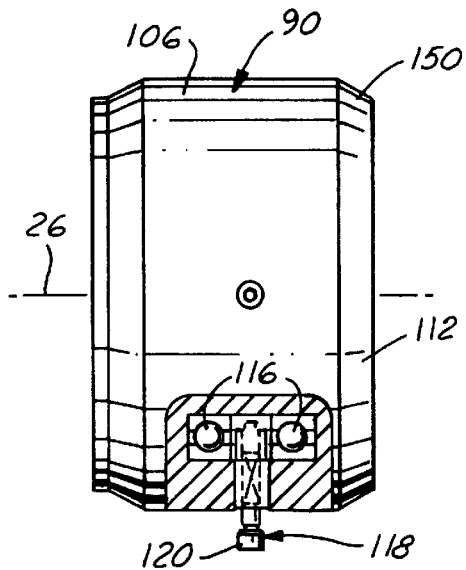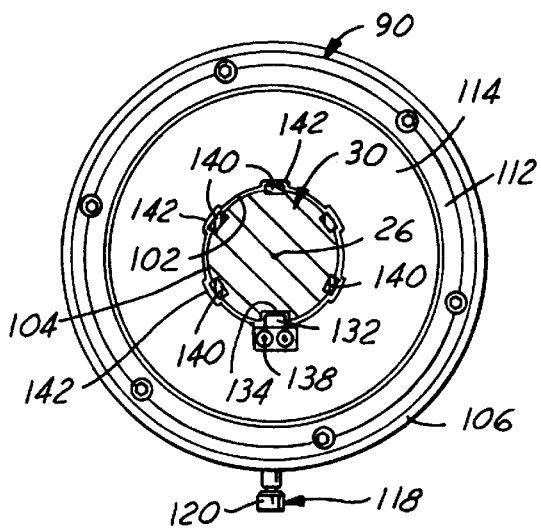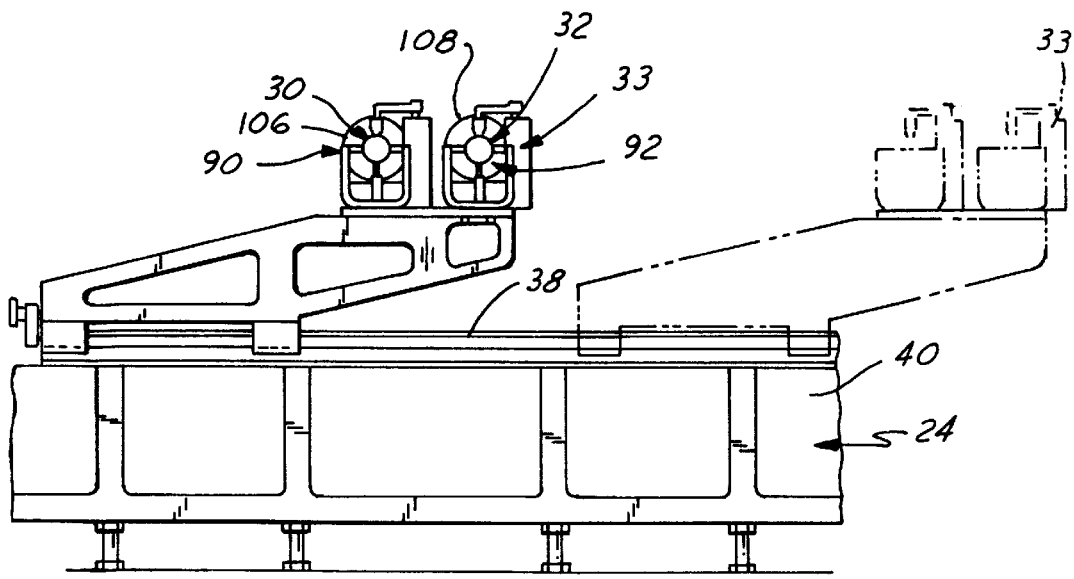

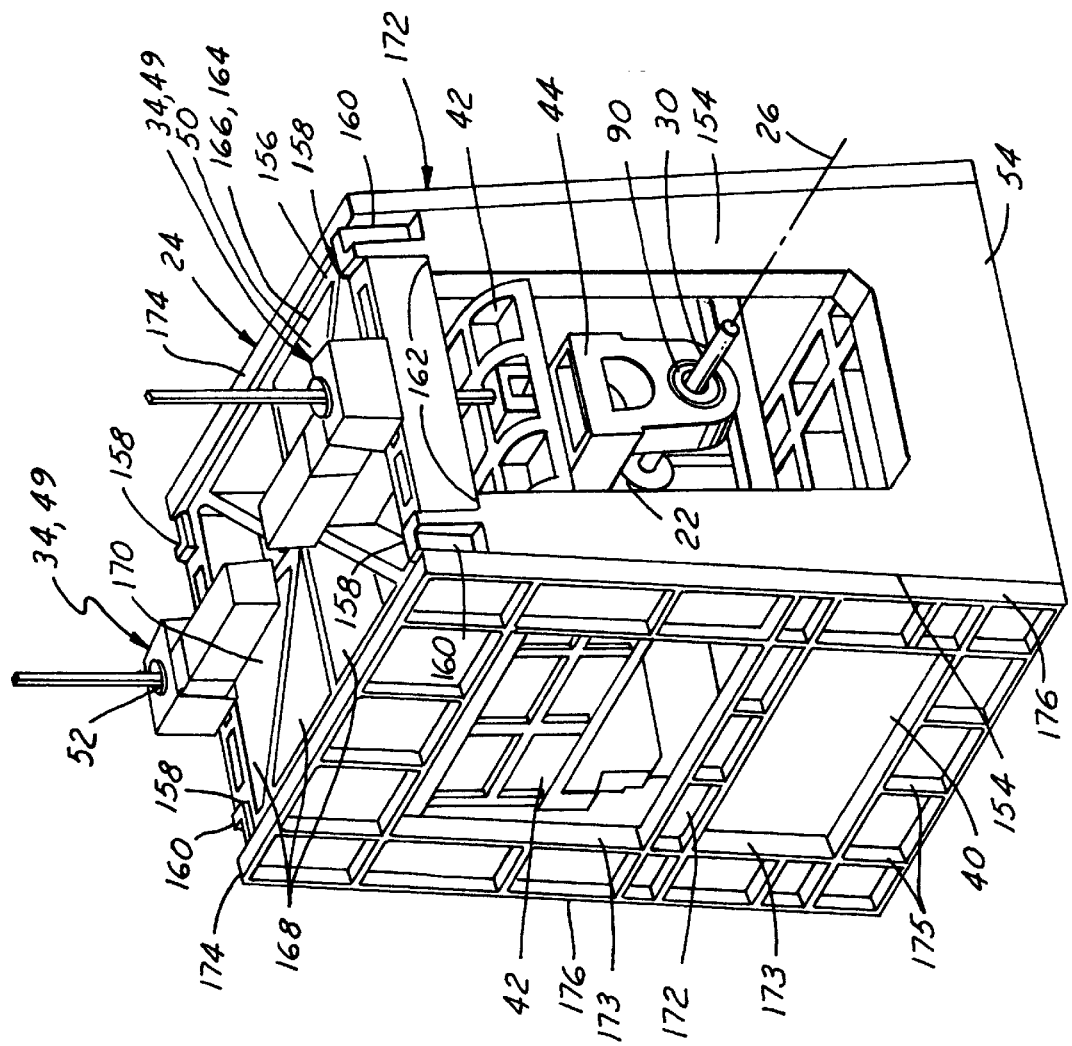
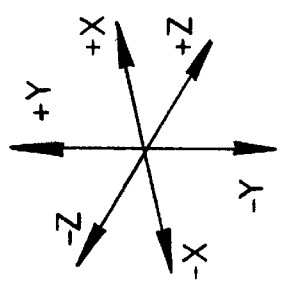
FIG.11

MACHINE AND METHOD FOR FLEXIBLE LINE BORING

TECHNICAL FIELD OF THE INVENTION

This invention relates generally to machining systems and, more particularly to line-boring machining systems for machining interrupted long bores.

INVENTION BACKGROUND

One of the most important and difficult drive train machining operations is the machining of cylinder block head cam bores and cylinder block crank journals—the long, straight interrupted bores that provide support for cams and crankshafts, respectively. Such machining operations that form spaced coaxial bores of common diameter and spaced relatively close together (less than 5 bore diameters) is known in the art as line boring. A series of spaced coaxial bores is sometimes referred to as an interrupted line bore. In high volume automotive applications, forming interrupted line bores such as cylinder block crank bores and cylinder head cam bores is one of the most critical of machining operations. This is because crank journals and cam bores have large length to diameter (L/D) ratios and because tolerances must be held very close to minimize wear between a crank shaft and an engine block or a cam shaft in a cylinder head. Currently, the time required to produce an interrupted line bore of this type is approximately 35 seconds per engine block or cylinder head. This makes the line boring operation one of the most time consuming operations in a serial engine machining and fabricating process. Therefore, it would be highly advantageous to automotive drive train manufacturers if they could reduce this machining time.

Dedicated transfer line technology is currently used to mass produce automotive power train components such as engines and transmissions. Depending on what volume of engines and transmissions must be produced, dedicated transfer lines will typically include 60 to 70 machine stations for cylinder heads and 140 to 150 stations for engine blocks. The machine stations include tooling that is dedicated, i.e., specifically designed to fabricate parts for only a single engine or transmission model. As a result, model changes require extensive re-tooling in the machine stations. The heavy investment required to create or retool a dedicated transfer line can only be justified if annual production volume for a given model will exceed 300,000 units and if that model will be produced for between 10 and 15 years.

The highly competitive international automotive market is now plagued by an over capacity for automobile production. Simultaneously, this customer-driven environment demands that new products be introduced more quickly and in greater variety. In addition, government fuel economy and emission regulations have imposed additional limitations on power train component design and manufacturing. Unfortunately, the current dedicated tooling used in automotive engine production is incapable of supporting the quick introduction of new product designs.

The changes in the international automotive market are creating an urgent need for new power train machining technologies that can provide manufacturing flexibility and upgradability at affordable cost. With the introduction of computer numerically controlled (CNC) machines into power train machining systems, the level of flexibility in engine production has increased considerably in recent years. One exception to this increase in the level of flexibility is in the machining of long bores such as cam and crank journals. Most line-boring operations are still carried out using dedicated manufacturing stations. The dedicated nature of these stations impedes the achievement of full flexibility in the production of drive train components.

The line-boring of cam and crank journals is carried out in predrilled holes or holes in cast, forged or extruded components. The boring process includes using a single point cutting tool, i.e., a boring bar having a single cutting insert, or a boring bar with multiple cutting inserts to remove metal from the pre-existing holes to enlarge or fine finish those holes. This can be accomplished either by rotating the workpiece or by rotating the boring bar. This operation can be performed horizontally, vertically or at some angle between the horizontal and the vertical.

The accuracy and precision achievable in a line boring operation depends on machine structure design, spindle speed, work holding devices, cutting insert and workpiece materials, cutting insert geometry, and the determination and use of optimum cutting speeds and feed rates. Machine movement inaccuracies introduce geometric errors. Excessive thermal loads and their variation introduce errors due to thermal strains.

The size of the holes to be bored dictates tool bar diameter. Generally, when the depth of the boring process is held constant, it is easier to machine larger diameter bores because a larger diameter tool is more rigid and can operate at slower spindle speeds.

Boring bar length is the most critical factor. If the depth of the hole to be bored is large, excessive tool overhang results. Process stability decreases as the length to diameter (L/D) ratio increases. This is because of the resulting vibrations, excessive deflection and loss of stiffness that result from large LID ratios. Problematically, there are many applications that call for boring bars having large L/D ratios while requiring extreme precision. In such cases, the boring bar may be supported by bushings both at the machine tool spindle and at the free end. The boring bar may, additionally or alternatively, be supported by intermediate bushings spaced along the length of the bar. Various boring bar and tool clamping configurations will affect the stability, deflection and vibration encountered during the boring operation. Upon engagement, the tangential force and the radial cutting force will attempt to push the tool away from the workpiece. This results in boring bar deflection. All of these factors must be managed during the boring process to ensure that the process is stable and capable of producing the precision required in a given product.

In a typical dedicated transfer line boring station, the spindle is mounted horizontally and can travel only in the horizontal (feed) direction. Attached to the spindle is a single dedicated boring bar that is configured to machine an interrupted line bore through the entire length of the engine or cylinder head casting. Due to the length of the bore, the boring bar is usually supported, as discussed above, by intermediate support bushings at a number of points along its length and/or outboard bushings adjacent either end of the boring bar to reduce the effective overhang and to ensure high machining precision.

To address the problems presented by line-boring tools having large L/D ratios, a method for minimizing the overhung length of the boring bar or tool has been successfully applied in high volume engine production. According to this method, the spindle is configured to allow a boring bar to be pushed through it. This allows the boring bar to be retracted into the spindle before entering the engine block. As a result, the spindle may be positioned closer to the part and the unsupported length of the bar is thus minimized.

Although this method increases the precision of the long bore machining process;

it also includes a major disadvantage in that the spindle must be made to receive a boring bar of only one specific size. The cost associated with designing and fabricating each such spindle and the dedicated nature of the machine make this method very impractical for low and mid-volume production runs.

Other drawbacks of dedicated transfer line stations include their cost and changeover time. Another drawback is that dedicated tooling of this type can only be used for a specific bore size. In addition, the requirement to use multiple support bushings limits flexibility in the machining operation and creates additional maintenance problems.

The problems associated with dedicated line boring operations can be partially alleviated by using a shorter tool, and mounting either the workpiece or the tool on an index table. The index table allows the shorter tool to form an interrupted line bore by alternately entering a workpiece from opposite sides of the workpiece. This approach decreases the length of the tools by 50% but introduces new inaccuracies related, in part, to the difficulty of precisely aligning and holding the tool in exactly opposite axial positions while forming the bore. Another approach is to double the number of working spindles equipped with tools and to position the spindles and tools so that the tools for an interrupted line bore in a workpiece by entering the workpiece from opposite sides simultaneously. However, this is a very expensive solution.

In machining operations other than line boring, flexibility has been introduced through the use of automatic tool changers and machines that introduce relative motion between spindle and workpiece in two or more axes. For example, U.S. Pat. Nos. 5,321,874 and 5,368,539 issued to Mills et al. (the Mills patents) disclose machining systems including boring stations or machining "cells". Each boring cell includes a spindle mounted for motion in three dimensions on X, Y and Z axes. The machining systems disclosed in these patents also include automatic tool changers.

An approach to increasing manufacturing flexibility in line boring operations is disclosed in Japanese publication JP 6318505 A, published Aug. 1, 1988. This publication discloses a line boring apparatus that includes a numerical control (NC) machine configured to automatically move a spindle into a position to selectively engage one of a plurality of boring bars from a boring bar cradle. The NC machine then adjusts the relative positions of the spindle, four intermediate support bushings and a workpiece to form an interrupted line bore in the workpiece. However, while the disclosed apparatus provides some flexibility in line boring it does not solve the limited flexibility or maintenance problems associated with the use of multiple bushings.

Another approach to increasing manufacturing flexibility in line boring is disclosed in U.S. patent application Ser. No. 08/837,650 (the '650 application) which is assigned to the assignee of the present invention and is incorporated herein by reference. According to the '650 application, a workpiece such as an engine block is located and clamped on a pallet and then brought to a boring station where the pallet is located and clamped on a shuttle. The shuttle moves solely along a straight horizontal path to move the engine block into a work station, locate the engine block during a machining operation, and then transfer the block out of the work station. First and second spindles are supported on respective floor-mounted three-axis drive systems at opposite sides of the shuttle. Tool changers select boring bars from a boring bar magazine and chuck the selected boring bars in the respective spindles. A computer numerical control (CNC) positions the spindles and the block and controls other machining parameters for different engine blocks, causing the spindles to insert their respective boring bars off-center into the crankshaft and camshaft bores, then moving the bars to center and backboring. However, the apparatus requires considerable floor space because the boring bar magazines and the three-axis drive systems are laterally displaced from each other. In addition, the apparatus is unable to accurately machine long bores without outboard ends of the boring bars being inserted into outboard pilot bushings. The requirement for outboard bushings requires additional floor space and limits flexibility because, for each boring bar to be used, an outboard pilot bushing must be pre-positioned adjacent the shuttle in a position opposite the workpiece from the spindle. In addition, for each boring bar to be used, an inboard pilot/support bushing must be pre-positioned adjacent the shuttle.

INVENTION SUMMARY

In accordance with the invention a line boring apparatus is provided that includes a spindle and an axes drive system suspended from a support frame and configured to move the spindle in three dimensions relative to the support frame. By suspending the spindle and drive system from the support frame, considerably less floor space is required to accommodate the apparatus. The axes drive and a controller are configured to move the spindle between positions axially aligned with boring bar ready positions adjacent a tool cradle and predetermined boring positions axially aligned with interrupted line bores to be machined in workpieces supported adjacent the support frame. This allows the apparatus to exchange boring bars without moving the tool cradle and to machine interrupted line bores in workpieces that are held stationary during machining. The spindle is configured to releasably engage and rotate a boring bar on a rotational spindle axis. The boring bar is configured to machine interrupted long bores in workpieces supported adjacent the support frame. The tool cradle is supported adjacent the spindle and is configured to support boring bars in respective ready positions for selective engagement by the spindle and to receive boring bars deposited by the spindle.

According to another aspect of the invention, the spindle is supported for limited angular motion about a horizontal droop axis. The droop axis is disposed perpendicular to the Z axis to compensate for tool droop. An anti-droop drive is connected between the spindle and the support frame and is configured to rotate the spindle about the droop axis. An anti-droop controller is connected to the anti-droop drive and is configured to tilt the spindle about the droop axis by an amount necessary to compensate for tool droop.

According to another aspect of the invention, the tool support is disposed along the spindle axis and is supported on the support frame for two-dimensional translational motion with the spindle relative to the support frame. The spindle is axially movable along the spindle axis relative to the tool support. The tool support is configured to support a rotating boring bar as the bar is advanced axially through the tool support to machine a long interrupted line bore in a workpiece disposed axially opposite the tool support from the spindle, without additional tool supports being required to support the length of the boring bar during boring.

According to another aspect of the invention, a method is provided for boring a long interrupted line bore using the line boring apparatus by first providing a workpiece having a first long interrupted line bore in a position adjacent the support frame, the workpiece being disposed on a side of the tool support axially opposite the spindle. A first boring bar is then provided on the tool cradle, the first boring bar being configured to bore the first long interrupted line bore in the workpiece. The first boring bar is then retrieved from the tool cradle by moving the spindle and tool support translationally relative to the support frame then actuating the spindle to engage and grasp the first boring bar. The axes drive is then actuated to move the spindle, the first boring bar and the tool support translationally relative to the support frame to a position where the spindle axis is coaxially aligned with the first long interrupted line bore of the workpiece. The first boring bar is then moved to a position supported in the tool support by actuating the axes drive to advance the spindle along the spindle axis relative to the tool support. The first long interrupted line bore is then bored in the workpiece by rotating the first boring bar on the spindle axis and continuing to advance the first boring bar along the spindle axis, through the tool support and into the first long interrupted line bore of the workpiece.

According to another aspect of the inventive method, a long interrupted line bore is bored while the spindle is tilted about a horizontal droop axis perpendicular to the Z axis to compensate for boring bar droop. The spindle is tilted by differentially controlling the two independently controllable spaced-apart drive members of the Y axis drive to compensate for increasing boring bar droop as the boring bar protrudes further from the tool support during boring.

Objects, features and advantages of this invention are to provide a method and apparatus for line-boring cam and crank journals that provide high product quality while being sufficiently agile to provide significantly shorter lead times for introducing new products, that can adapt to large fluctuations in demand during the lifetime of a product, are inexpensive enough to make it cost-effective to produce products that require production runs of only about 50,000 units annually, are flexible and upgradable at an affordable cost, are adaptable to a variety of products, provide high product quality, a capacity to adapt to and absorb newly emerging technology, require a relatively small area of floor space and thereby reduce production cost.

BRIEF DRAWING DESCRIPTION

These and other objects, features and advantages of this invention will be apparent from the following detailed description of the preferred embodiment(s) and best mode, appended claims, and accompanying drawings in which:

FIG. 2 is a front view of a support bushing disposed on a boring bar of the line boring apparatus of FIG. 1 with the boring bar shown in cross section;

FIG. 3 is a partially cut-away side view of the bushing of FIG. 2;

FIG. 10 is side view of the support frame base for the tool cradle, support frame base and spindle of FIG. 8;

FIG. 11 is a schematic perspective view of the line boring apparatus of FIG. 1 with a tool cradle removed for clarity.

DETAILED DESCRIPTION

Figure 1:
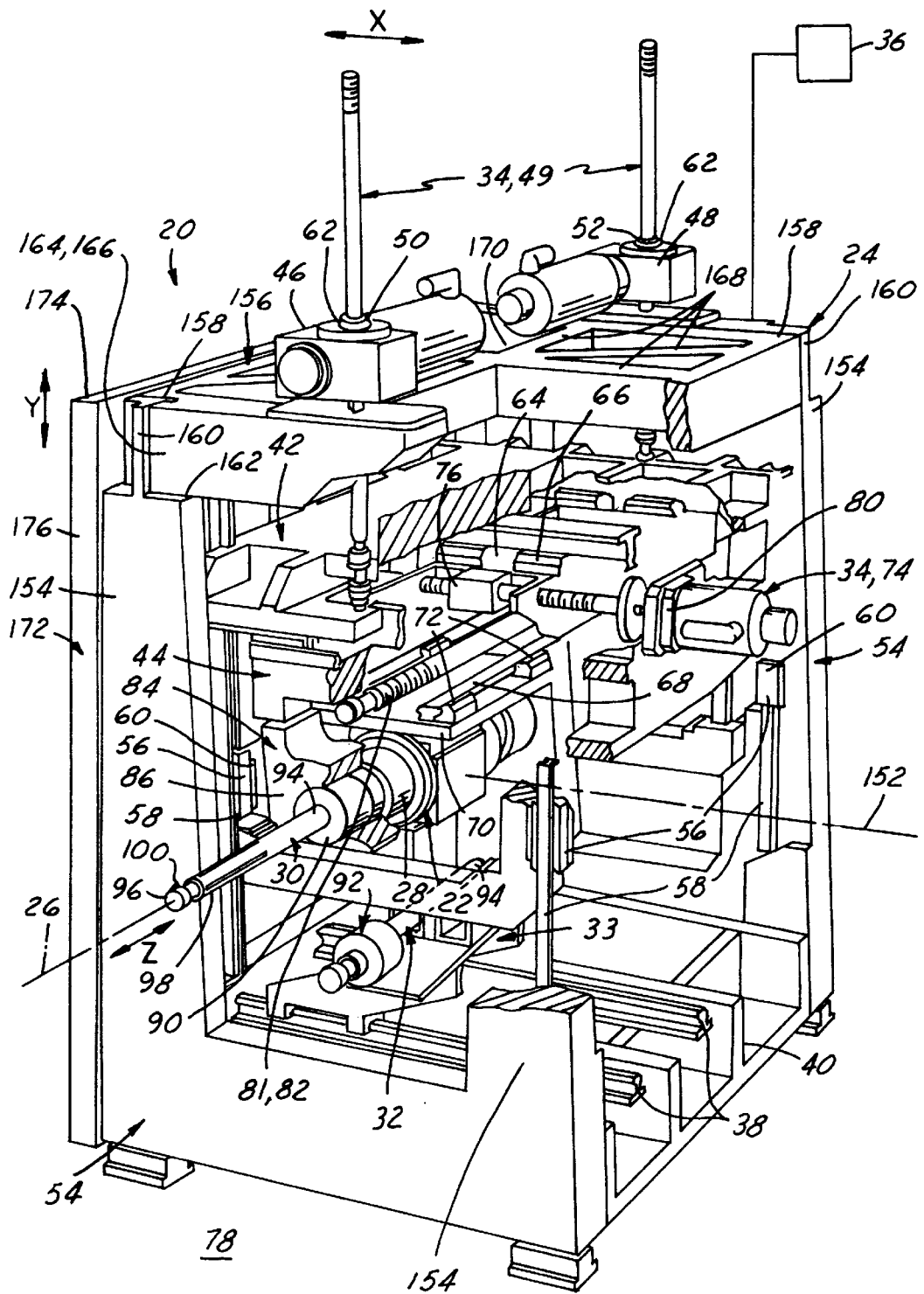
FIG. 1 is a partially cut-away perspective view of a line boring apparatus embodying this invention.
Figure 8:
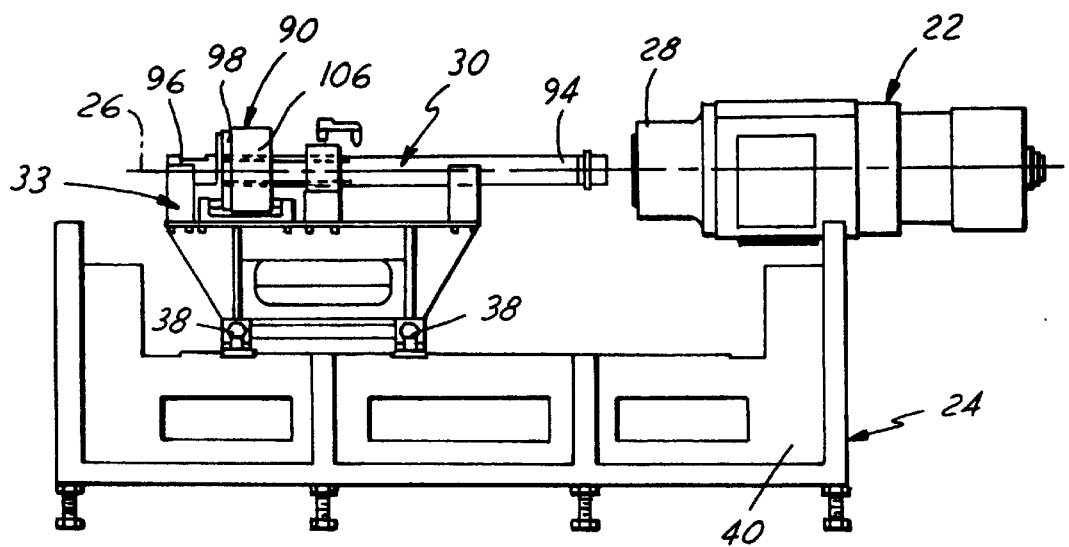
FIG. 8 is a front view of a support frame base for a tool cradle and spindle of the line boring apparatus of FIG. 1.
Figure 9:
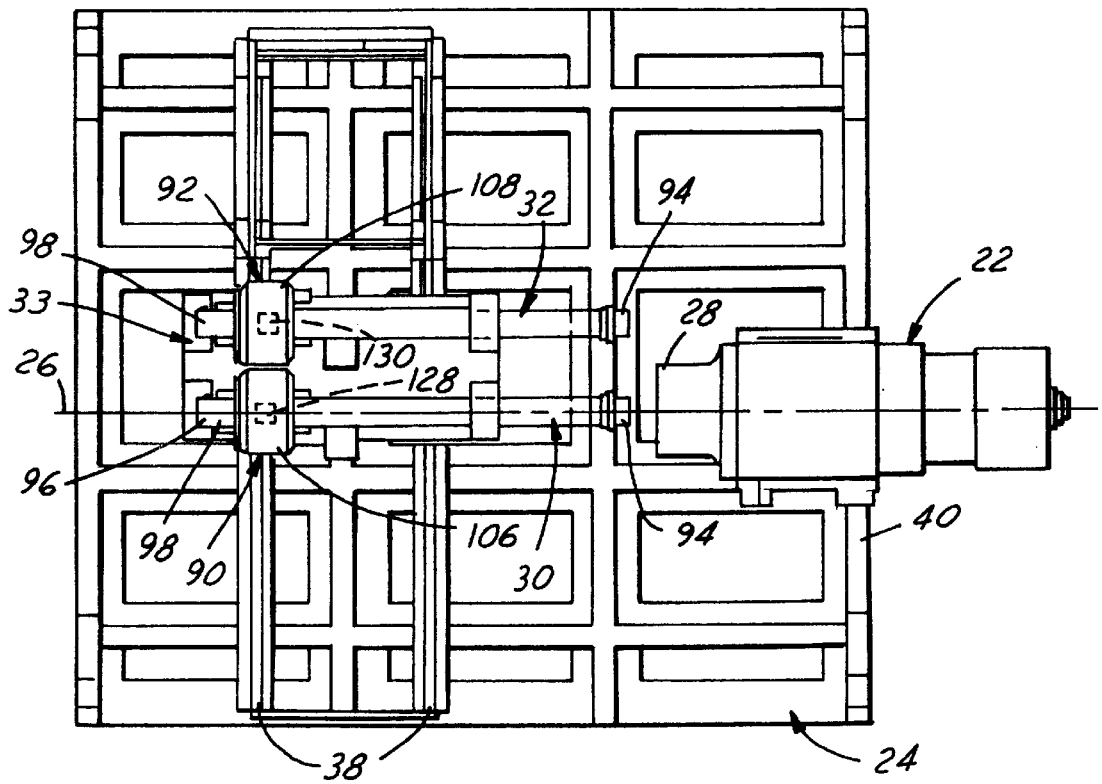
FIG. 9 is a top view of the tool cradle, support frame base and spindle of FIG. 8.

FIG. 1 illustrates a line boring apparatus 20 embodying this invention with a motorized high-precision spindle (typically 7.5 hp, max rotational speed 6,000 rpm) generally indicated at 22 in FIGS. 1, 8 and 9. (In other embodiments the line boring apparatus 20 may include suitable spindles rated at other than 7.5 hp and having max rotational speeds other than 6,000 rpm.) The spindle 22 is supported on a support frame, generally indicated at 24 in FIGS. 1 and 8–12, for translational motion in three dimensions relative to the support frame 24 including motion in a horizontal feed direction parallel to a generally horizontal rotational spindle axis or "Z" axis shown at 26 in FIGS. 1–6, 8 and 9. The spindle 22 includes a standard taper mechanism, shown at 28 in FIGS. 1, 4, 8 and 9, that is configured to releasably engage and rotate tools or boring bars 30, 32 about the rotational Z axis 26. Each boring bar, generally indicated at 30 in FIGS. 1, 2, 4–6 and 8–12 and at 32 in FIG. 9, is configured to machine pre-drilled, cast, forged or extruded interrupted long bores in workpieces such as engine or cylinder head castings that are located and held adjacent the support frame 24. An axes drive, generally indicated at 34 in FIGS. 1, 8 and 9 is connected between the spindle 22 and the support frame 24 and is configured to move the spindle 22 translationally relative to the support frame 24. A tool cradle, generally indicated at 33 in FIGS. 8–10, is supported adjacent the spindle 22 on the support frame 24 beneath the axes drive 34. As is best shown in FIG. 9, the tool cradle 33 is configured to support at least two boring bars 30, 32 in respective ready positions for selective engagement and removal by the spindle 22 and to receive the boring bars 30, 32 when deposited by the spindle 22 after boring. A controller, schematically represented at 36 in FIG. 1, includes a computer numerically controlled (CNC) machine that is connected to the spindle 22 and the axes drive 34 and is programmed to actuate spindle rotation and to operate the axes drive 34 to move the spindle 22 relative to the support frame 24. The axes drive 34 and controller 36 are configured to move the spindle 22 between positions axially aligned with the respective boring bar ready positions and predetermined boring positions axially aligned with interrupted line bores to be machined in workpieces supported adjacent the support frame 24. This allows the apparatus 20 to exchange boring bars 30, 32 without moving the tool cradle 33 and to machine interrupted line bores in workpieces that are held stationary during machining.

As shown in FIG. 1, the tool cradle 33 is supported below the axes drive 34 in close proximity to the spindle 22. The tool cradle 33 is movably mounted on a pair of linear rails 38 fastened to a base portion 40 of the support frame 24. The tool cradle 33 is locked in position on the rails 38 during boring and tool change operations, but may be unlocked and moved along the rails 38 to a position where machine operators can more easily gain access to the cradle 33 for purposes such as tool replacement and/or maintenance.

As shown in FIG. 1, the spindle 22 is supported on a carriage 42 and a saddle 44 that are, in turn, suspended from the support frame 24 by two Y axis ballscrew drives 46, 48. This allows a tool cradle 33 or tool changer to be mounted below the spindle 22, the carriage 42 and the saddle 44. The carriage 42 or "Y" frame is suspended from the support frame 24 by the two Y axis ballscrews 50, 52 for linear motion relative to the support frame 24 in a generally vertical direction along a generally vertical Y axis. The carriage 42 includes a large U shaped metal casting and is slidably connected to end walls 54 of the support frame by eight rail carriages 56 configured to slide vertically along vertically oriented guide rails 58. The carriage 42 is honeycombed in areas of low stress concentration to reduce the mass an increase the stiffness of the carriage 42. Two linear encoders 60 are connected to the controller 36 to provide electrical signals to the controller 36 representing the position of the carriage 42 relative to the support frame 24. The controller 36 is programmed to use this information to control the positional accuracy of the carriage 42. The linear encoders 60 are mounted, one on each of the end walls 54, adjacent the linear rails. Two rotary encoders 62 are mounted on the respective Y axis ballscrew servo motors and are connected to the controller 36. Signals from the rotary encoders 62 feed back rotary position information to the controller 36.

The saddle 44 or "Z" frame is a long, narrow frame supported under the carriage 42 for linear motion relative to the carriage 42 in a generally horizontal direction relative to the carriage 42 along a generally horizontal X axis that is generally perpendicular to the rotational Z axis 26 and to the Y axis. Rail carriages 64 are mounted on a top surface of the saddle 44 and are slidably engaged on three horizontally-oriented carriage linear guide rails 66 mounted on an underside of the carriage 42. Two saddle linear guide rails 68 are mounted lengthwise along an underside of the saddle 44.

Figure 12:
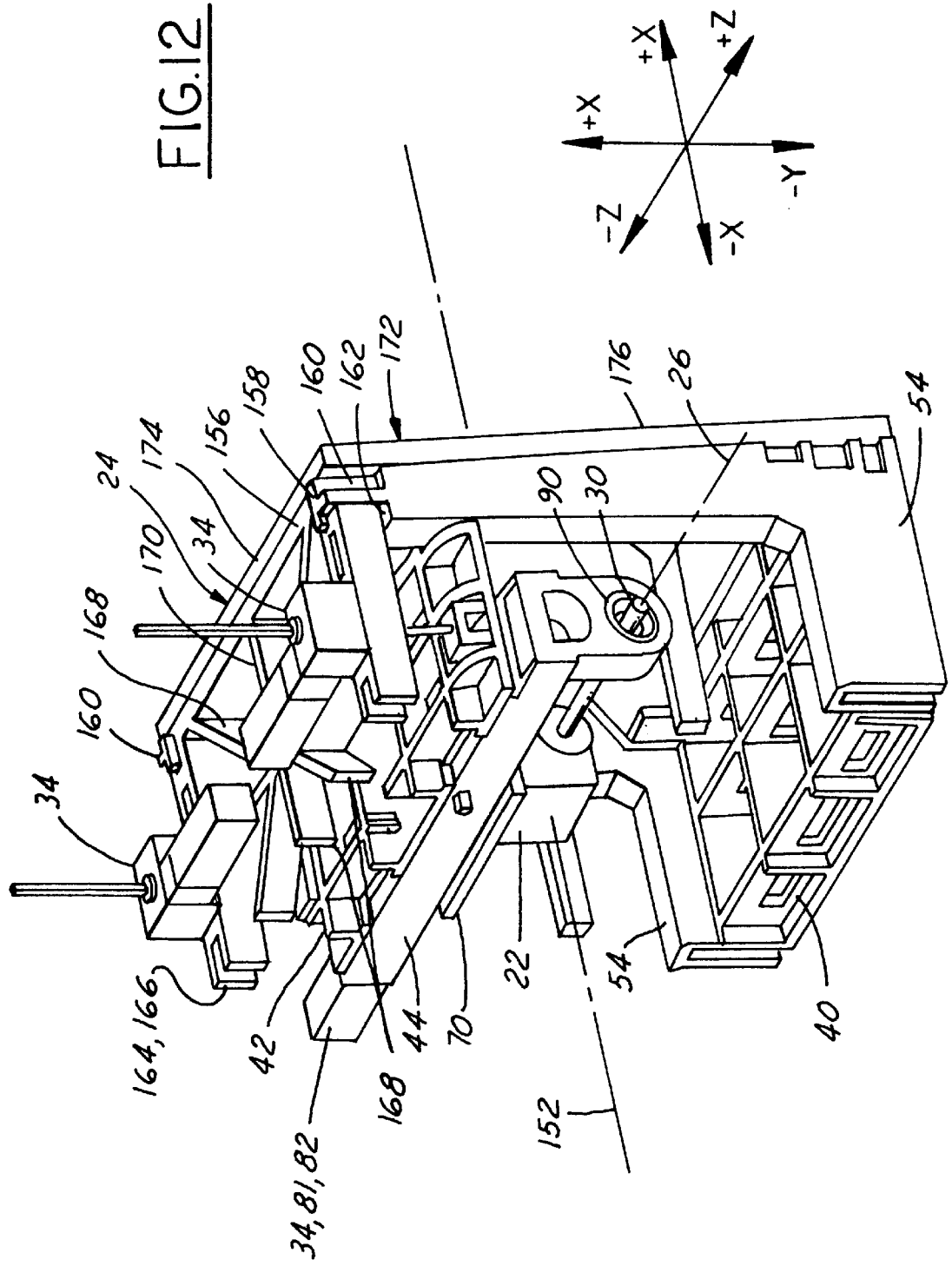
FIG. 12 is a cross-sectional schematic perspective view of the line boring apparatus of FIG. 11.

As is best shown in FIGS. 1, 11 and 12, the spindle 22 is supported in an inverted orientation to a flat metal spindle sub plate or slide, shown at 70 in FIGS. 1 and 12. The spindle slide 70 is supported under the saddle 44 for linear motion relative to the saddle 44 in a third generally horizontal "Z" or feed direction along the Z axis 26. Four slide rail carriages 72 are mounted to the spindle slide 70 with two of the slide rail carriages 72 slidably engaging each of the saddle linear guide rails 66.

The axes drive 34 includes a Y axis drive 49 that is operatively connected between the support frame 24 and the carriage 42. The Y axis drive 49 includes the two Y axis ball screw drives 46, 48 that move the carriage 42 vertically relative to the support frame 24 along the Y axis.

An X axis drive 74 includes an X axis ball screw drive 76 operatively connected between the carriage 42 and the saddle 44. The X axis ball screw drive 76 moves the saddle 44 horizontally and perpendicular to the Z axis 26. The X axis ballscrew drive 76 is mounted in the carriage 42 such that it is in tension, i.e., is being stretched, to minimize effects of thermal growth and backlash. A linear encoder (not shown) is mounted in front of a forward most one of the three linear rails 66 that is closest to a position 78 where a workpiece would be disposed to be machined by the apparatus 20. The linear encoder provides a translational position signal for the saddle 44 to the controller 36. In addition, a rotary encoder 80 is mounted on the X axis drive servo motor and provides rotary position information on the servo motor to the controller 36.

A Z axis drive, generally indicated at 81 in FIGS. 1 and 12, includes a single electric Z axis ball screw drive 82 supported under the saddle 44 and operatively connected between the saddle 44 and the spindle 22 to move the spindle 22 reciprocally along the Z axis. A rotary encoder on the Z axis drive 81 provides sufficient position information to the controller 36 for the controller 36 to control the position of the spindle 22 along the Z axis. A linear encoder may also be incorporated but is unnecessary because bore depth is not critical in through-hole operations. Each ballscrew drive 46, 48, 76, 82 is of a type well known in the art and includes a standard gear box/ballscrew/servo or stepper motor system.

To provide adequate support for the relatively long boring bars 30, 32 used for boring long interrupted line bores, the apparatus 20 comprises a tool support generally indicated at 84 in FIGS. 1 and 4–6. The tool support 84 is configured and positioned to guide a boring bar into the first journal of an interrupted line bore and is mounted in a front end of the saddle 44 and includes a downwardly-extending portion 86 of that frame. The tool support 84 includes a bushing retainer 85 comprising a flanged sleeve 87 fit concentrically into a generally cylindrical hole 88 formed in the downwardly extending frame portion 86. The tool support bushing retainer 85 is axially spaced from the spindle 22 and is coaxially aligned with the Z axis 26. The tool support 84 is supported on the support frame 24 for two-dimensional translational motion along the X and Y axes with the spindle 22 relative to the support frame 24. The spindle 22 is axially movable along the Z axis 26 relative to the tool support 84. The tool support 84 is configured to support a rotating boring bar 30, 32 as the bar is advanced axially through the tool support 84 to machine a long interrupted line bore in a workpiece disposed axially opposite the tool support 84 from the spindle 22, without additional tool supports being required to support the length of the boring bar 30, 32 during boring. As will be explained in detail below, the bushing retainer 85 of the tool support 84 is configured to support rotating boring bars 30, 32 of varying diameters by removably engaging a support bushing, generally indicated at 90 in FIGS. 1–12 and at 92 in FIGS. 9 and 10. One bushing 90, 92 is supported on each boring bar 30, 32. The bushings 90, 92 may have different interior diameters to accommodate boring bars 30, 32 of differing diameters but have outer diameters and shapes that complement an interior diameter and shape of the flanged sleeve 87 of the bushing retainer 85.

As shown in FIGS. 9 and 10, two or more boring bars 30, 32 may be supported in respective ready positions on the tool cradle 33 at one time. While the cradle 33 shown in the drawing is configured to hold two boring bars 30, 32, other embodiments may include tool cradles configured to hold more than two boring bars. Each boring bar 30, 32 has an inboard end 94 configured to be engaged by the spindle taper mechanism 28 in a conventional manner. Each boring bar 30, 32 may be a single point cutting tool having a single cutting insert 100 or a multiple edged cutting tool having multiple cutting inserts, with one or more cutting inserts 100 supported on an outboard end 98 of each boring bar 30, 32. The cutting inserts 100 are configured to enlarge or fine finish a pre-formed hole by removing metal from the hole as the boring bar is rotated on the Z axis 26.

The boring bars 30, 32 may be configured to compensate for undesired boring bar displacement. For example, one or more of the boring bars 30, 32 may each include a sensor configured to sense tool insert displacement relative to the tool and an actuator configured to adjust tool insert position relative to the boring bar. A suitable spindle and boring bar arrangement adapted to including a suitable compensating boring bar of this type is disclosed in U.S. patent application Ser. No. 09/130,783 and is incorporated herein by reference. One of the support bushings 90, 92 is coaxially supported on each boring bar 30, 32. Each bushing 90, 92 has an inner diameter, shown at 102 in FIGS. 2 and 6, sized to slidably engage an outer diameter 104 of the boring bar 30, 32 that the bushing 90, 92 is supported on. Each bushing 90, 92 is mounted on its respective boring bar 30, 32 so that it can be slid axially along the length of its respective boring bar between inboard and outboard positions adjacent the respective inboard and outboard ends 94, 98 of the boring bar. Each bushing 90, 92 has a generally cylindrical and slightly tapered frusto conical outer surface 106 sized to engage a complementary generally cylindrical and slightly tapered frusto conical inner surface 110 of the bushing retainer 85.

Figure 4:
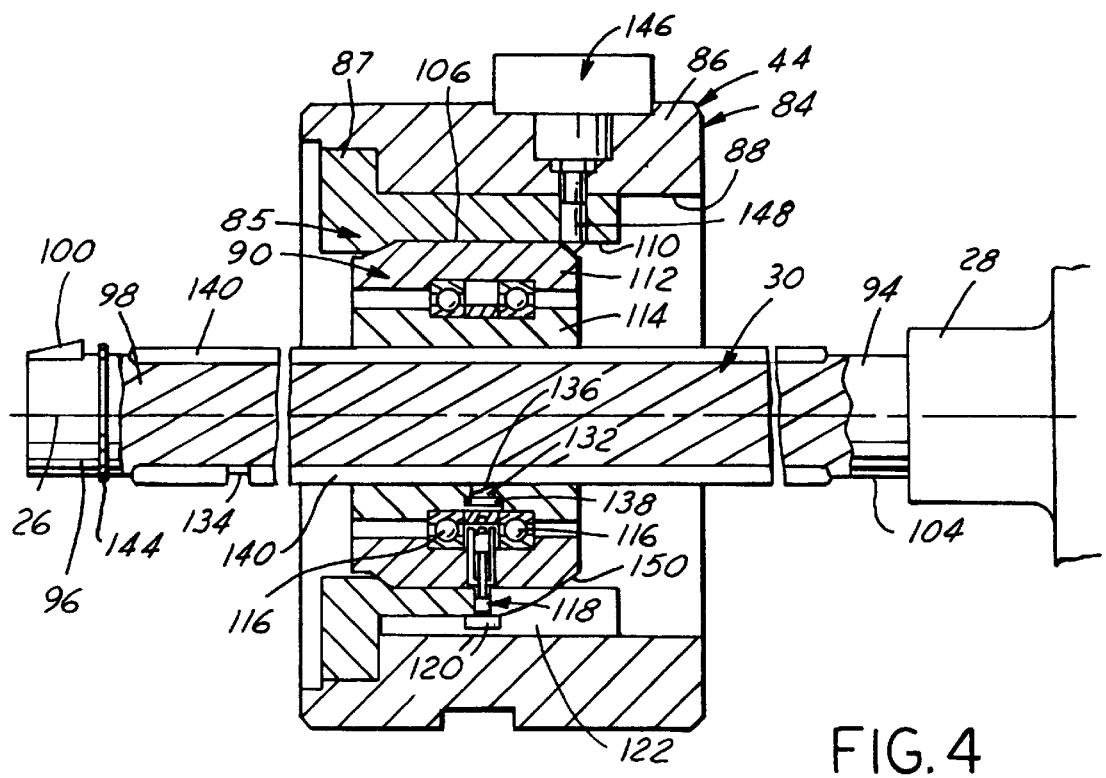
FIG. 4 is a partially cut-away partial cross sectional side view of boring bar, support bushing and tool support portions of the line boring apparatus of FIG. 1 with the support bushing in an engaged position within the tool support and between inboard and outboard positions on the boring bar.
Figure 5:
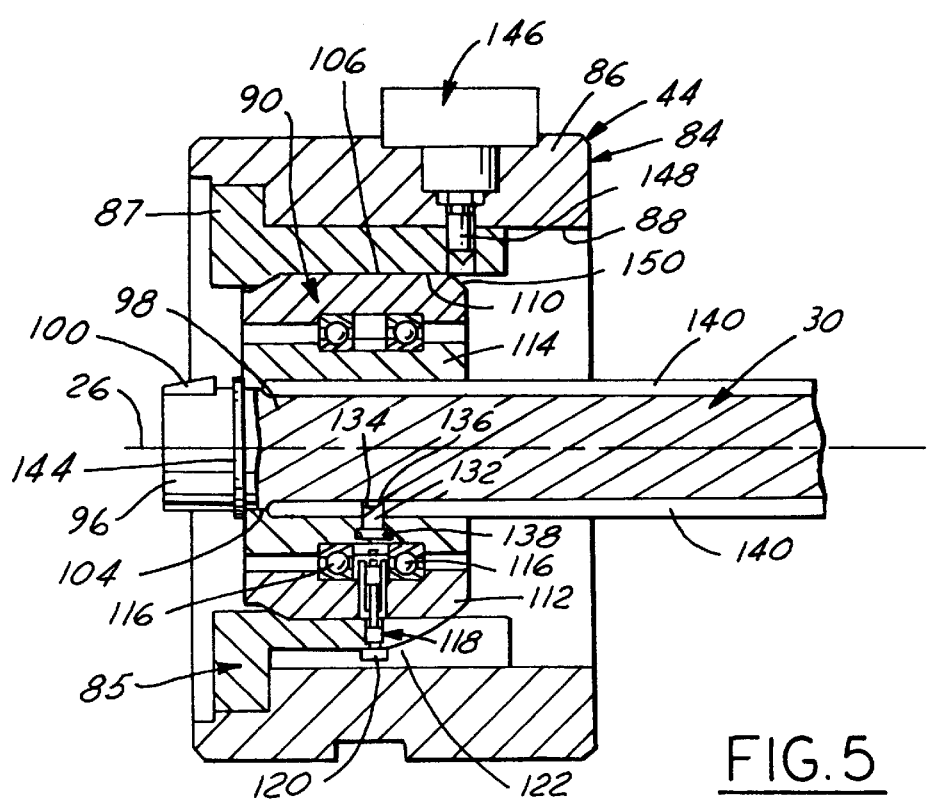
FIG. 5 is a partially cut-away partial cross sectional side view of boring bar, support bushing and tool support portions of FIG. 4 with the support bushing in an engaged position within the tool support and an outboard position on the boring bar.
Figure 6:
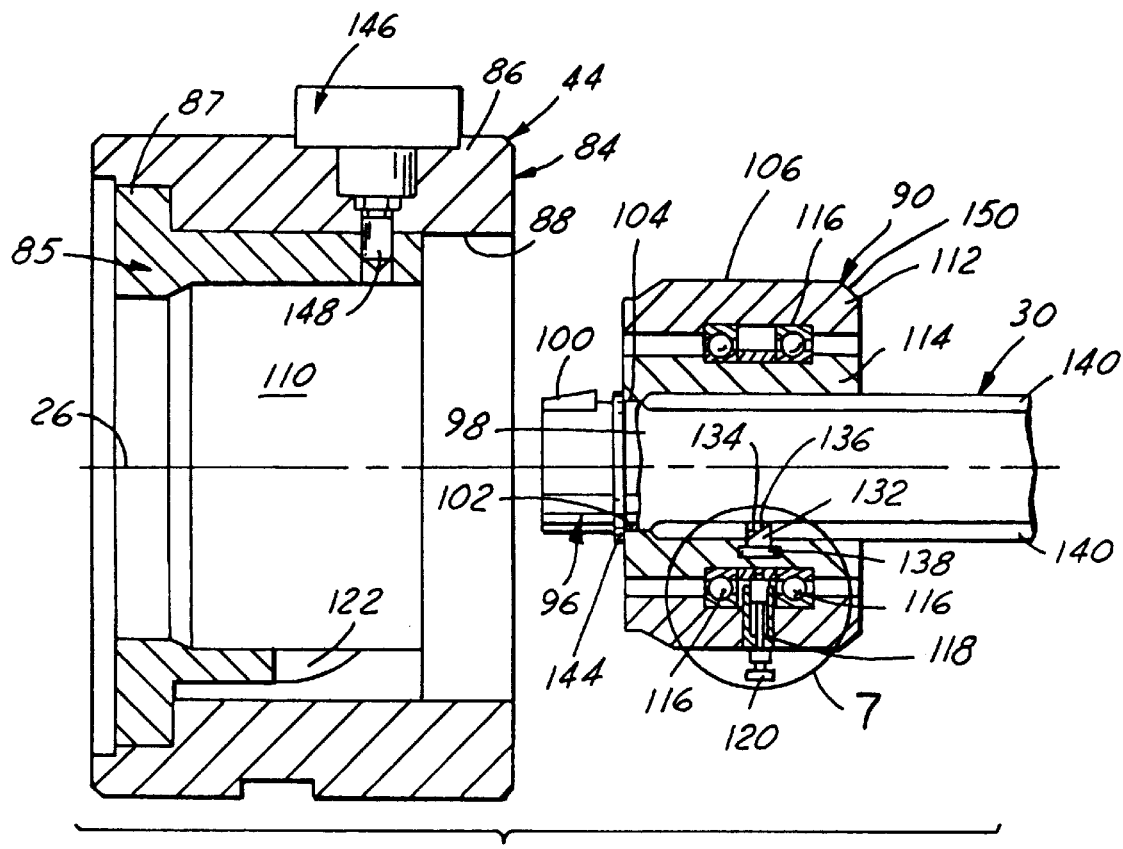
FIG. 6 is a partially cut-away partial cross sectional side view of boring bar, support bushing and tool support portions of FIGS. 4 and 5 with the support bushing disengaged from the tool support and in an outboard position on the boring bar.
Figure 7:
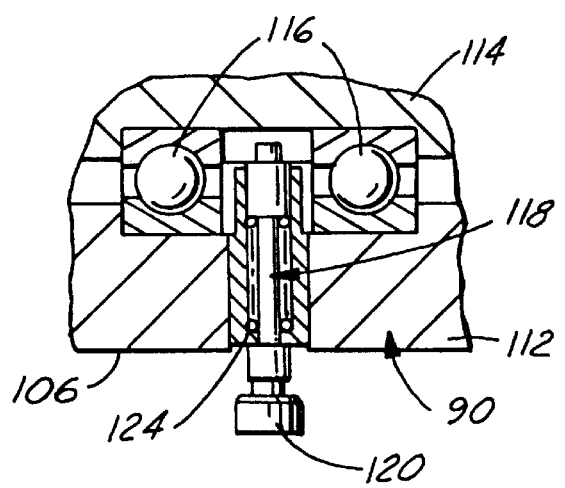
FIG. 7 is an enlarged partial cross-sectional view of the support bushing of FIG. 6.

Each bushing 90, 92 is a "live" bushing in that each comprises an outer bearing race 112 and an inner bearing race 114 as best shown in FIGS. 4–6. The outer race 112 of each bushing includes the slightly tapered frusto conical outer surface 106 configured to releasably engage the complementary inner frusto conical surface 110 of the bushing retainer 85. The outer race 112 of each bushing is also secured against rotational and axial movement relative to the bushing retainer 85 when engaged within the bushing retainer 85. However, the outer race 112 of each bushing is axially withdrawable from the bushing retainer 85 when disengaged from the bushing retainer 85.

The inner race 114 of each bushing 90, 92 is concentrically supported within the outer race 112 against axial and radial movement relative to the outer race 112. Roller bearings 116 are disposed between the inner and outer races 114, 112 and support the inner race 114 for rotational movement within the outer race 112 and about the Z axis 26. However, the inner race 114 is releasably engageable with the outer race 112 against relative rotation via a detent pin best shown at 118 in FIG. 7. The detent pin 118 is mounted in the outer race 112 and engageable with a detent disposed in the inner race 114. In other words, the inner race 114 is secured against rotational motion relative to the outer race 112 when the detent pin 118 is engaged and the inner race 114 is free to rotate within the outer race 112 when the detent pin 118 is disengaged. When the detent pin 118 is disengaged, the boring bar 30, 32, being keyed to the inner diameter 102 of the inner race 114, is free to rotate with the inner race 114 as the boring bar is axially advanced through the inner race 114 during boring. The detent pin 118 is shown engaged in FIGS. 2, 3, 6 and 7 and is shown disengaged in FIGS. 4 and 5.

The detent pin 118 in each bushing 90, 92 is configured to automatically disengage when that bushing is axially inserted into the bushing retainer 85. A T-shaped head 120 of each detent pin 118 protrudes radially downward from the frusto conical outer surface 106 of the bushing 90, 92 it is supported in, in a position to engage a slotted track 122 in the frusto conical inner surface 110 of the bushing retainer 85 as shown in FIGS. 4 and 5. The track 122 is shaped to receive the T-shaped head 120 of a detent pin 118 as a bushing 90, 92 is axially inserted into the bushing retainer 85. The slotted track 122 is also shaped to engage the head 120 of a detent pin 118 and to pull the pin 118 downward against the upward bias of a coil spring 124 and out of engagement with the inner race 114 of the bushing as the Z axis drive 81 pushes the bushing 90, 92 into a fully engaged position within the bushing retainer 85. The tool cradle 33 includes detent pin receptacles 128, 130 positioned and shaped to receive the heads 120 of the detent pins 118 when a boring bar 30, 32 and bushing 90, 92 are deposited on the cradle. The detent pin receptacles 128, 130 are shown hidden in FIG. 9.

As best shown in FIGS. 2, 4, 5 and 6, the inner race 114 of each bushing 90, 92 includes a spring-loaded locking pin 132 that is engageable with a locking hole 134 in the boring bar 30, 32 when the bushing 90, 92 is in the inboard position on the boring bar shown in FIGS. 5, 6 and 8–10. The locking pins 132 are configured to lock their respective bushings 90, 92 against axial movement relative to the boring bar 30, 32 when engaged in the locking pin hole 134. The engagement between a bushing inner race 114 and a boring bar is overridable by a predetermined amount of axial force applied by the Z axis drive 81 to withdraw the spindle 22 and boring bar. The application of axial withdrawal force to a boring bar 30, 32 will cause an edge of the locking pin hole 134 to engage a ramped surface 136 of the locking pin 132, driving the locking pin 132 downward against the upward bias of a spring 138 housed in the inner race 114. Six axially-extending longitudinal carbide guide pads shown at 140 in FIGS. 2 and 4–6, are spaced radially around an outer circumferential surface of each bar to support the boring bars 30, 32 on already-bored portions or journals of an interrupted line bore being bored. As is best shown in FIG. 2, the inner circumferential surface 102 of each bushing inner race 114 has a shape complementary to the guide pads. The complementary shape includes longitudinal channels 142 configured to slidably accommodate the guide pads 140. In other words, the inner circumferential surface of each bushing 90, 92 is keyed to the guide pads 140 to prevent relative rotational motion between the boring bars 30, 32 and their respective bushings 90, 92 when the bushings are not engaged in the bushing retainer. The longitudinal guide pads 140, boring bars 30, 32 and bushings 90, 92 may be constructed as disclosed in U.S. Pat. No. 5,221,165 which is incorporated herein by reference.

As shown in FIGS. 4–6, each boring bar 30, 32 includes a radially-extending locating detent on a locating ring 144 disposed inboard of the cutting insert 100 adjacent the outboard end 98 of each boring bar 30, 32. Each such locating ring 144 is seated within a circumferential groove in its respective boring bar 30, 32. Each ring 144 extends radially from the outer circumferential surface of its respective boring bar 30, 32 by a distance less than a radial thickness of the guide pads 140 to allow the rings 144 to engage and axially withdraw their respective bushings 90, 92 when their respective boring bars 30, 32 and bushings 90, 92 are being removed for storage on the tool cradle 33.

The tool support 84 includes three hydraulically-driven clamps generally indicated at 146 in FIGS. 4–6. The clamps 146 are supported on the saddle 44 adjacent the bushing retainer 85. The clamps are configured to secure a bushing 90, 92 within the bushing retainer 85 against axial withdrawal. More, specifically, each clamp 146 includes a conical-tipped cylindrical pin 148 that is hydraulically drivable radially inward to an engaged position from an aperture in the frusto conical inner surface 110 of the bushing retainer 85. In their radially convergent engaged positions, shown in FIG. 4, the pins 148 engage a beveled annular axially inner edge 150 of the outer race 112 of a bushing engaged in the bushing retainer 85. Therefore, in their engaged positions, the pins 148 prevent an engaged bushing from being axially withdrawn and insure that the bushing is fully seated in the bushing retainer 85.

The carriage 42, the saddle 44 and the spindle 22 are supported for limited angular motion about a horizontal droop axis shown at 152 in FIGS. 1 and 12. The first and saddles 42, 44 and spindle 22 are so supported to compensate for drooping in a boring bar that increases as the boring bar protrudes further from the tool support 84 during boring. The droop axis 152 is disposed perpendicular to the Z axis 26. An anti-droop drive is connected between the carriage 42 and the support frame 24 and is configured to rotate the spindle 22 and tool support 84 about the droop axis 152. An anti-droop controller 36 (included in the CNC) is connected to the anti-droop drive and is programmed to tilt the spindle 22 and tool support 84 about the droop axis 152 by an amount necessary to compensate for tool droop. The anti-droop controller 36 and drive may be configured to compensate for predicted, preset values of boring bar droop and/or may be configured to actively compensate for changing degrees of actual droop during boring. A suitable anti-droop controller and drive arrangement is disclosed in U.S. patent application Ser. No. 60/096,948, filed Aug. 18, 1998 and incorporated herein by reference.

The Y axis drive 49, in addition to moving the spindle 22 vertically relative to the support frame 24 also serves as the anti-droop drive. When functioning to compensate for boring bar droop, the Y axis ball screw drives 46, 48 are controlled independently to tilt the spindle 22 about the droop axis 152 by an amount sufficient to cancel any droop effect.

The base 40 of the support frame 24 provides a mounting location for the tool cradle 33 as shown in FIGS. 1 and 8–10. The two end walls 54 of the support frame 24 mount to opposite edges of the base 40 and provide the vertical support for the spindle 22, frames 42, 44 and drives. The end walls 54 have squared-off U-shapes, the U shape of each end wall 54 being defined by a pair of upwardly extending members 154 having side edges that taper inward as they extend upward. The four linear guide rails 58 are mounted in a generally vertical orientation on inward-facing surfaces of each of the end walls 54. Two of the eight rail carriages 56 on the carriage 42 slidably engage each of the guide rails to guide the carriage 42 as the Y axis drive 49 moves the carriage 42 vertically along the Y axis.

A generally rectangular ceiling generally indicated at 156 in FIGS. 1, 11 and 12 mounts on the two end walls 54 and includes rectangular cut-outs 158 at each of four corners sized to engage upper support members 160 that extend integrally upwardly from each upwardly extending end wall member 154 and rest on horizontal support surfaces 162 at upper ends of the end wall members 154. The ceiling 156 is a framework of elongated metal ceiling beams 164, 168, each beam having a vertically-oriented generally rectangular cross-section. The ceiling framework includes an outer rectangular frame 166 and a pattern of cross beams 168 that extend radially outward from a central point within the rectangular frame to and connecting with the ceiling beams 164 forming the outer rectangular frame 166. The Y axis ball screw drives 46, 48 are mounted at spaced apart locations along a central longitudinal cross beam 170 of the ceiling 156 which makes the end walls 54 the primary load carrying elements of the support frame 24.

A pair of generally rectangular metal side walls, generally indicated at 172 in FIGS. 1, 11 and 12, include upper edges 174 that rest adjacent the outer rectangular frame 166 of the ceiling 156, side edges 176 that rest against the inwardly tapering side edges of the end walls 54 and bottom edges disposed adjacent the base 40. Each side wall 172 includes a pair of rectangular cut-outs 173 disposed vertically in relation to one another to reduce weight and allow access to components within the support frame 24. As shown in FIG. 11, the sidewalls 172 are honeycombed with a rectangular pattern of ribs 175 to further reduce weight.

The support frame 24 is constructed to be generally symmetric about a central vertical axis to help cancel errors that would otherwise be introduced by thermal expansion and/or contraction of portions of the support frame 24. The frame 24 provides a cage surrounding the spindle 22, slide 70, saddle 44 and carriage 42 and provides an opening below the spindle for receiving the tool changer cradle—all within the cage frame.

A long interrupted line bore may be machined according to the invention using the line boring apparatus 20 described above by first providing a workpiece having a first long pre-formed rough interrupted line bore in a position adjacent the support frame 24 accessible for boring by the line boring apparatus 20. The workpiece is positioned on a side of the tool support 84 axially opposite the spindle 22.

A first boring bar 30 of the two boring bars 30, 32 is configured to bore the first long interrupted line bore is provided on the tool cradle 33 and is retrieved from the tool cradle 33 by moving the spindle 22 and tool support 84 translationally in two dimensions relative to the support frame 24 then advancing the spindle 22 along the Z axis 26 and actuating the spindle taper mechanism 28 to engage and grasp the inner end of the first boring bar 30. The spindle 22, the first boring bar 30 and the tool support 84 translationally in two dimensions relative to the support frame 24 to a position where the Z axis 26 is coaxially aligned with the first long interrupted line bore of the workpiece.

The first boring bar 30 is then moved to a position supported in the tool support 84 by actuating the Z axis drive 81 of the axes drive 34 to advance the spindle 22 along the Z axis 26 relative to the tool support 84. The first long interrupted line bore is then bored in the workpiece by causing the spindle 22 to rotate the first boring bar 30 about the Z axis 26, then continuing to advance the first boring bar 30 along the Z axis 26, through the tool support 84 and into the first long interrupted line bore of the workpiece. As the Z axis drive 81 is advancing the spindle 22 and boring bar, the spindle 22 and tool support 84 are tilted about the horizontal droop axis 152 to compensate for increasing boring bar droop as the boring bar protrudes progressively further from the tool support 84 during boring. The spindle 22 and tool arc tilted along with the carriage 42 about the horizontal droop axis 152 by differentially controlling the two independently controllable spaced-apart ball screw drive members 46, 48 of the Y axis drive 49.

A workpiece may be provided that has two long interrupted line bores of differing dimensions rather than a single interrupted line bore. In this case, two boring bars 30, 32 are provided on the tool cradle 33. The first boring bar 30 is configured to bore a first one of the two long interrupted line bores and the second bar is configured to bore a second one of the long interrupted line bores. After boring the first long interrupted line bore, the first boring bar 30 is removed from the workpiece by actuating the Z axis drive 81 of the axes drive 34 to retract the spindle 22 along the Z axis 26. The first boring bar 30 is then deposited on the tool cradle 33 by actuating the Z and Y axis drives 81, 49 of the axes drive 34 to move the spindle 22 and tool support 84 translationally in two dimensions relative to the support frame 24 then causing the spindle 22 to release the first boring bar 30.

A second boring bar 32 of the two boring bars 30, 32 is then retrieved from the tool cradle 33 in the same manner as was the first boring bar 30, is positioned in alignment with the second long interrupted line bore and is rotated about and advanced along the Z axis 26 through the tool support 84 and into the long interrupted line bore. After boring is complete, the second boring bar 32 is removed from the workpiece in generally the same manner as the first boring bar 30 and is replaced on the tool cradle 33.

Two workpieces having respective long interrupted line bores of differing dimensions may be sequentially secured adjacent the support frame 24 for machining of the bores. In this case two boring bars 30, 32 are provided on the tool cradle 33 each configured to bore one of the two long interrupted line bores. After a first of the two workpieces is secured adjacent the support frame 24 with a first long interrupted line bore disposed in a position accessible for machining, a first of the two boring bars 30, 32 that is configured to machine the first long interrupted line bore, is selected, used to bore the first long interrupted line bore, and is then returned to the cradle. The second workpiece is then moved into position, replacing the first workpiece. The second of the two boring bars 30, 32 is then selected, is used to machine the second long interrupted line bore, and is replaced on the tool cradle 33.

In the above processes, when the boring bars 30, 32 are stored on the tool cradle 33, their respective bushings are supported at the respective outboard positions on the boring bars 30, 32 with the locking pins engaged in the locking pin holes in the boring bars 30, 32 and the respective detent pins 118 engaged in the detents in their respective bushing inner races 114. As described above, the first and second support bushings have respective inner diameters sized to slidably engage the respective outer diameters of the first and second boring bars 30, 32. As is also described above, the first and second bushings 90, 92 have generally identically shaped frusto conical outer surfaces 106, 108 sized and shaped to engage the complementary frusto conical inner surface 110 of the bushing retainer 85. Therefore, when the Z axis drive 81 moves the first boring bar 30 to a position supported in the tool support 84 for boring, the first support bushing engages the bushing retainer 85 and the controller 36 actuates the three hydraulic clamps 146 to preclude axial withdrawal of the bushing during boring. As the first support bushing moves into the bushing retainer 85, the radially downwardly protruding head 120 of the detent pin 118 engages the slotted track 122 in the busing receptacle and is drawn downward, releasing the inner race 114 and the boring bar for rotation relative to the outer race 112. When the bushing retainer 85 arrests the advancement of the first bushing, the locking pin 132 is overridden allowing the boring bar to continue advancing by sliding through the inner race 114 of the bushing. As the first long interrupted line bore is being bored in the workpiece the Z axis drive 81 continues to advance the first boring bar 30 along the Z axis 26, through the inner race 114 of the first support bushing and into the first long interrupted line bore of the workpiece.

After boring the first long interrupted line bore, the first boring bar 30 is removed from the workpiece when the controller 36 actuates the Z axis drive 81 of the axes drive 34 to retract the spindle 22 and boring bar along the Z axis 26 while drawing the boring bar axially outward through the support bushing. The first support bushing is then removed from the bushing retainer 85 when the controller 36 actuates the spindle 22 to stop rotating with the locking pin hole 134 in the boring bar disposed downward in axial alignment with the spring biased locking pin 132 in the inner race 114 of the bushing. The controller 36 then actuates the Z axis to withdraw the boring bar and actuates the three hydraulic clamps 146 to release the bushing for axial inward movement. As the Z axis drive 81 withdraws the boring bar to the point where the bushing is at the outboard position on the boring bar, the locating ring 144 engages the inner race 114 of the first support bushing, the locking pin 132 engages the locking pin hole 134 in the boring bar and begins withdrawing the bushing from the bushing retainer 85. As the first bushing is withdrawn from the bushing retainer 85, the detent pin 118 is withdrawn from the slotted track 122 and, being spring loaded upward to the engaged position, moves upward to engage the detent in the inner race 114, arresting any further relative rotation between the inner and outer races 114, 112 of the first support bushing 90.

The first boring bar 30 and support bushing 90 are then returned to the tool cradle 33 when the controller 36 actuates the axes drive 34 to move the spindle 22 and tool support 84 translationally relative to the support frame 24 and then causes the spindle 22 to release the first boring bar 30 once the bar is in or near the ready position on the tool cradle 33. The spindle may include a resolver configured to transmit signals to the controller that indicate boring bar rotational position. This enables the controller to insure that the detent pin 118 is aligned with the slotted track 122 during boring bar advancement and that locking pin 132 is aligned with the locking pin hole 134 during boring bar withdrawal.

The second boring bar 32 and support bushing 92 are then retrieved from the tool cradle 33 and positioned for boring in much the same manner as was the first boring bar 30 except that the second boring bar 32 and the second support bushing 92 are moved into a position where the Z axis 26 is coaxially aligned with the second long interrupted line bore rather than the first long interrupted line bore. After boring the second long interrupted line bore, the second boring bar 32 and bushing are returned to their ready position on the tool cradle 33.

The methods and apparatus 20 described above allow agile and flexible line-boring of high quality cam and crank journals by allowing boring bars 30, 32 of varying diameters and high L/D ratios to be changed automatically and moved to a variety of boring positions on a single workpiece or successive workpieces. Because the spindle 22, frames 42, 44 and drives are suspended from the support frame 24 above the tool cradle 33, and because all three axes of motion are imparted to the spindle 22 alone, the apparatus 20 requires a relatively small area of floor space.

We intend this description to illustrate certain embodiments of the invention rather than to limit the invention. Therefore, I have used descriptive words rather than limiting words. Obviously, it's possible to modify this invention from what the description teaches. Within the scope of the claims, one may practice the invention other than as described.

What is claimed is:

1. A line boring apparatus comprising:
   a support frame;
   a spindle supported on the support frame for three-dimensional translational motion relative to the support frame, the spindle configured to releasably engage and rotate a boring bar about a Z axis, the boring bar configured to machine interrupted long bores in workpieces supported adjacent the support frame;
   a tool cradle supported adjacent the spindle and configured to support boring bars in respective ready positions for selective engagement by the spindle and to receive boring bars deposited by the spindle;
   an axes drive connected between the spindle and the support frame and configured to move the spindle translationally relative to the support frame;

a controller operatively connected to the axes drive and configured to operate the axes drive to move the spindle relative to the support frame; the axes drive and controller being further configured to move the spindle between positions axially aligned with the respective boring bar ready positions and predetermined boring positions axially aligned with interrupted line bores to be machined in workpieces supported adjacent the support frame; and the spindle and axes drive being suspended from the support frame to reduce the floor space required to accommodate the apparatus.

2. A line boring apparatus as set forth in claim 1 in which a carriage is suspended from the support frame for linear motion relative to the support frame in a first direction along a Y-axis;

a saddle is supported on the carriage for linear motion relative to the carriage in a second direction relative to the carriage along an X axis; and the spindle is supported on the saddle for linear motion relative to the saddle in a third direction along the Z axis.

3. A line boring apparatus as set forth in claim 2 in which:

the axes drive includes:

a Y axis drive operatively connected between the support frame and the carriage and is configured to move the carriage vertically relative to the support frame along the Y axis;

an X axis drive operatively connected between the carriage and the saddle and is configured to move the saddle horizontally and perpendicular to the Z axis; and a Z-axis drive operatively connected between the saddle and the spindle and is configured to move the spindle reciprocally along the Z axis.

4. A line boring apparatus as set forth in claim 2 in which:

the apparatus comprises a tool support including a bushing retainer disposed in the saddle, axially spaced from the spindle and coaxially aligned with the Z axis;

the apparatus includes two boring bars supportable in respective ready positions on the tool cradle and having inboard ends engageable with the spindle;

a cutting insert is supported on an outboard end of each boring bar; and a support bushing is coaxially supported on each boring bar, each bushing having an inner diameter sized to slidably engage the outer diameter of the boring bar that the bushing is supported on, each bushing being axially movable along its respective boring bar between inboard and outboard positions adjacent respective inboard and outboard ends of each boring bar, each bushing having an outer diameter sized to engage an inner diameter of the bushing retainer.

5. A line boring apparatus as set forth in claim 4 in which each bushing is a live bushing comprising:

an outer race configured to releasably engage the bushing retainer, the outer race being secured against rotational and axial movement relative to the receptacle when engaged with the bushing retainer, the outer race being axially withdrawable from the bushing retainer when disengaged from the bushing retainer; and an inner race concentrically supported within the outer race against axial movement relative to the outer race, the inner race being releasably engageable with the outer race, the inner race being secured against rotational motion relative to the outer race when engaged with the outer race, the inner race being free to rotate within the outer race when disengaged from the outer race to allow the boring bar to rotate as the boring bar is axially advanced through the bushing during boring, the inner race engageable with the boring bar in the outboard position against axial movement relative to the boring bar, the engagement between the inner race and the boring bar being overridable by a predetermined amount of axial force.

6. A line boring apparatus as set forth in claim 5 further including axially extending longitudinal guide pads spaced radially around an outer circumferential surface of each bar.

7. A line boring apparatus as set forth in claim 6 in which:

an inner circumferential surface of each bushing inner race includes longitudinal channels configured to slidably accommodate the guide pads; and each boring bar includes a radially-extending locating detent disposed inboard of the cutting insert adjacent the outboard end of each boring bar, each locating detent extending radially from the outer circumferential surface of its respective boring bar by a distance less than a radial thickness of the guide pads.

8. A line boring apparatus as set forth in claim 5 in which the tool support includes a clamp supported on the saddle adjacent the bushing retainer and is configured to secure a bushing within the bushing retainer against axial withdrawal.

9. A line boring apparatus as set forth in claim 8 in which the clamp is configured to drive a bushing axially into the bushing retainer.

10. A line boring apparatus as set forth in claim 1 in which:

the spindle is supported for limited angular motion about a horizontal droop axis perpendicular to the Z axis;

an anti-droop drive is connected between the spindle and the support frame and is configured to rotate the spindle about the droop axis; and an anti-droop controller is connected to the anti-droop drive and is configured to tilt the spindle about the droop axis by an amount necessary to compensate for tool droop.

11. A line boring apparatus as set forth in claim 10 in which the anti-droop controller and drive are configured to actively compensate for changing degrees of droop during boring.

12. A line boring apparatus as set forth in claim 10 in which:

the axes drive includes a Y axis drive operatively connected between the support frame and the spindle and configured to move the spindle vertically relative to the support frame;

the Y axis drive comprises the anti-droop drive; and the anti-droop drive includes two spaced-apart drive members connected between the spindle and the support frame, the drive members being independently controllable to tilt the spindle about the droop axis.

13. A line boring apparatus as set forth in claim 1 in which the tool cradle is supported below the axes drive.

14. A line boring apparatus as set forth in claim 1 in which the tool cradle is mounted on the support frame.

15. A line boring apparatus as set forth in claim 1 in which the support frame is generally symmetrical about a central vertical axis.

16. A line boring apparatus as set forth in claim 1 in which the support frame includes a ceiling supported over a base by a pair of end walls, the axes drive and spindle being suspended from the ceiling by the Y axis drive.

17. A line boring apparatus as set forth in claim 1 in which the controller comprises a computer numerically controlled (CNC) machine.

18. A line boring apparatus as set forth in claim 4 in which the boring bar configured to compensate for undesired boring bar displacement and includes:
   a sensor configured to sense tool insert displacement relative to the tool; and
   an actuator configured to adjust tool insert position relative to the boring bar.

19. A line boring apparatus comprising:
   a support frame;
   a spindle supported on the support frame for three-dimensional translational motion relative to the support frame, the spindle configured to releasably engage and rotate a boring bar on a rotational spindle axis;
   a tool cradle supported adjacent the spindle and configured to support boring bars in respective ready positions for selective engagement by the spindle and to receive boring bars deposited by the spindle;
   an axes drive connected between the spindle and the support frame and configured to move the spindle translationally relative to the support frame;
   a controller operatively connected to the axes drive and configured to operate the axes drive to move the spindle relative to the support frame; and
   a tool support disposed along the spindle axis and supported on the support frame for two-dimensional translational motion with the spindle relative to the support frame, the spindle being axially movable along the spindle axis relative to the tool support, the tool support configured to support a rotating boring bar as the bar is advanced axially through the tool support to machine a long interrupted line bore in a workpiece disposed axially opposite the tool support from the spindle, without additional tool supports.

20. A line boring apparatus as set forth in claim 19 in which:
   a carriage is supported on the support frame for linear motion relative to the support frame in a first direction along a Y axis;
   a saddle is supported on the carriage for linear motion relative to the carriage in a second direction relative to the carriage along an X axis; and
   the spindle and tool support are supported on the saddle for linear motion relative to the saddle in a third direction along the Z axis.

21. A line boring apparatus as set forth in claim 20 in which the axes drive includes:
   a Y axis drive operatively connected between the support frame and the carriage and is configured to move the carriage vertically relative to the support frame along the Y axis;
   an X axis drive operatively connected between the carriage and the saddle and is configured to move the saddle horizontally and perpendicular to the Z axis; and
   a Z-axis drive operatively connected between the saddle and the spindle and is configured to move the spindle reciprocally along the Z axis.

22. A line boring apparatus as set forth in claim 20 in which:
   the tool support includes a bushing retainer disposed in the saddle, axially spaced from the spindle and coaxially aligned with the Z axis;
   the apparatus includes at least two boring bars supportable in respective ready positions on the tool cradle and having inboard ends engageable with the spindle;
   a cutting insert is supported on an outboard end of each boring bar; and
   a support bushing is coaxially supported on each boring bar, each bushing having an inner diameter sized to slidably engage the outer diameter of the boring bar that the bushing is supported on, each bushing being axially movable along its respective boring bar between inboard and outboard positions adjacent respective inboard and outboard ends of each boring bar, each bushing having an outer diameter sized to engage an inner diameter of the bushing retainer.

23. A line boring apparatus as set forth in claim 22 in which each bushing is a live bushing comprising:
   an outer race configured to releasably engage the bushing retainer, the outer race being secured against rotational and axial movement relative to the receptacle when engaged with the bushing retainer, the outer race being axially withdrawable from the bushing retainer when disengaged from the bushing retainer; and an inner race concentrically supported within the outer race against axial movement relative to the outer race, the inner race being releasably engageable with the outer race, the inner race being secured against rotational motion relative to the outer race when engaged with the outer race, the inner race being free to rotate within the outer race when disengaged from the outer race to allow the boring bar to rotate as the boring bar is axially advanced through the bushing during boring, the inner race engageable with the boring bar in the inboard position against axial movement relative to the boring bar, the engagement between the inner race and the boring bar being overridable by a predetermined amount of axial force.

24. A line boring apparatus as set forth in claim 19 and further including axially-extending longitudinal guide pads connected to and radially spaced around an outer circumferential surface of each boring bar.

25. A line boring apparatus as set forth in claim 19 in which the boring bar is configured to compensate for undesired boring bar displacement and includes:
   a sensor configured to sense tool insert displacement relative to the tool; and
   an actuator configured to adjust tool insert position relative to the boring bar.

26. A method for boring a long interrupted line bore using a line boring apparatus comprising a spindle supported on a support frame, a tool cradle supported adjacent the spindle, an axes drive connected between the spindle and the support frame, and a tool support disposed along a rotational spindle axis and supported on the support frame; the method including the steps of:
   providing a workpiece having a first long interrupted line bore in a position adjacent the support frame, the workpiece being disposed on a side of the tool support axially opposite the spindle;
   providing a first boring bar on the tool cradle, the first boring bar configured to bore the first long interrupted line bore in the workpiece;
   retrieving the first boring bar from the tool cradle by moving the spindle and tool support translationally relative to the support frame then actuating the spindle to engage and grasp the first boring bar;
   actuating the axes drive to move the spindle, the first boring bar and the tool support translationally relative to the support frame to a position where the spindle axis is coaxially aligned with the first long interrupted line bore of the workpiece;

moving the first boring bar to a position supported in the tool support by actuating the axes drive to advance the spindle along the spindle axis relative to the tool support; and boring the first long interrupted line bore in the workpiece by rotating the first boring bar on the spindle axis and continuing to advance the first boring bar along the spindle axis, through the tool support and into the first long interrupted line bore of the workpiece.

27. A method as set forth in claim 26 in which the boring step includes tilting the spindle about a horizontal droop axis disposed perpendicular to the Z axis to compensate for increasing boring bar droop as the boring bar protrudes further from the tool support during boring.

28. A method as set forth in claim 26 in which:

the step of providing a workpiece includes providing a workpiece having first and second long interrupted line bores of differing dimensions;

after the step of providing a boring bar a second boring bar is provided on the tool cradle, the second bar being configured to bore the second long interrupted line bore; and the following steps are included after the step of boring the first long interrupted line bore:

removing the first boring bar from the workpiece by actuating the axes drive to retract the spindle along the spindle axis;

depositing the first boring bar on the tool cradle by actuating the axes drive to move the spindle and tool support translationally relative to the support frame then causing the spindle to release the first boring bar;

retrieving the second boring bar from the tool cradle by moving the spindle and tool support translationally relative to the support frame, then actuating the spindle to engage and grasp the second boring bar;

actuating the axes drive to move the spindle, the second boring bar and the tool support translationally relative to the support frame to a position where the spindle axis is coaxially aligned with the second long interrupted line bore of the workpiece;

moving the second boring bar to a position supported in the tool support by actuating the axes drive to advance the spindle along the spindle axis relative to the tool support;

boring the second long interrupted line bore in the workpiece by rotating the second boring bar on the spindle axis and continuing to advance the second boring bar along the spindle axis, through the tool support and into the second long interrupted line bore of the workpiece;

removing the second boring bar from the workpiece by actuating the axes drive to retract the spindle along the spindle axis; and depositing the second boring bar on the tool cradle by actuating the axes drive to move the spindle and tool support translationally relative to the support frame, then causing the spindle to release the second boring bar.

29. A method as set forth in claim 26 in which:

after the step of providing a boring bar a second boring bar is provided on the tool cradle, the second bar being configured to bore the second long interrupted line bore; and the following steps are included following the step of depositing the first boring bar on the tool cradle:

removing the first boring bar from the workpiece by actuating the axes drive to retract the spindle along the spindle axis;

depositing the first boring bar on the tool cradle by actuating the axes drive to move the spindle and tool support translationally relative to the support frame, then causing the spindle to release the first boring bar;

providing a second workpiece having a second long interrupted line bore in a position adjacent the support frame, the workpiece being disposed on a side of the tool support axially opposite the spindle;

retrieving the second boring bar from the tool cradle by moving the spindle and tool support translationally relative to the support frame, then actuating the spindle to engage and grasp the second boring bar;

actuating the axes drive to move the spindle, the second boring bar and the tool support translationally relative to the support frame to a position where the spindle axis is coaxially aligned with the second long interrupted line bore of the workpiece;

moving the second boring bar to a position supported in the tool support by actuating the axes drive to advance the spindle along the spindle axis relative to the tool support;

boring the second long interrupted line bore in the workpiece by rotating the second boring bar on the spindle axis and continuing to advance the second boring bar along the spindle axis, through the tool support and into the second long interrupted line bore of the workpiece;

removing the second boring bar from the workpiece by actuating the axes drive to retract the spindle along the spindle axis; and depositing the second boring bar on the tool cradle by actuating the axes drive to move the spindle and tool support translationally relative to the support frame, then causing the spindle to release the second boring bar.

30. A method as set forth in claim 26 in which:

the tool support includes a bushing retainer axially spaced from the spindle and coaxially aligned with the Z axis;

the step of providing a first boring bar includes providing a first support bushing coaxially supported on the first boring bar, the first support bushing having an inner diameter sized to slidably engage the outer diameter of the first boring bar;

after the step of providing a first boring bar, a second support bushing is coaxially supported on a second boring bar and the second boring bar and bushing are supported on the tool cradle, the second boring bar being configured to bore a second long interrupted line bore in a workpiece, the second bushing having an inner diameter sized to slidably engage the outer diameter of the second boring bar, the first and second bushings each having an outer diameter sized to engage an inner diameter of the bushing retainer, each bushing being axially movable along its respective boring bar between inboard and outboard positions adjacent respective inboard and outboard ends of each boring bar, the boring bars being stored on the tool cradle with the bushings disposed at the respective outboard positions of the boring bars;

the step of moving the first boring bar to a position supported in the tool support includes engaging the first support bushing in the bushing retainer by actuating the axes drive to advance the spindle along the spindle axis relative to the tool support and releasably securing the first support bushing against axial withdrawal from the bushing retainer; and the step of boring the first long interrupted line bore in the workpiece includes continuing to advance the first boring bar along the spindle axis, through the first support bushing and into the first long interrupted line bore of the workpiece.

31. A method as set forth in claim 30 in which the following steps are included following the step of boring the first long interrupted line bore:

removing the first boring bar from the workpiece by actuating the axes drive to retract the spindle and boring bar along the spindle axis while drawing the boring bar through the support bushing;

removing the first support bushing from the bushing retainer by engaging the support bushing at the outboard position on the boring bar as the boring bar is withdrawn;

depositing the first boring bar and support bushing on the tool cradle by actuating the axes drive to move the spindle and tool support translationally relative to the support frame, then causing the spindle to release the first boring bar;

retrieving the second boring bar and support bushing from the tool cradle by moving the spindle and tool support translationally relative to the support frame, then actuating the spindle to engage and grasp the second boring bar;

actuating the axes drive to move the spindle, the second boring bar and the second support bushing translationally relative to the support frame to a position where the spindle axis is coaxially aligned with the second long interrupted line bore;

moving the second boring bar to a position supported in the tool support and engaging the second support bushing in the bushing retainer by actuating the axes drive to advance the spindle along the spindle axis relative to the tool support;

releasably securing the second support bushing against axial withdrawal from the bushing retainer;

boring the second long interrupted line bore in the workpiece by rotating the second boring bar on the spindle axis and continuing to advance the second boring bar along the spindle axis, through the second support bushing and into the second long interrupted line bore of the workpiece;

removing the second boring bar from the workpiece by actuating the axes drive to retract the spindle along the spindle axis;

removing the second support bushing from the bushing retainer by engaging the second support bushing at the outboard position on the second boring bar as the second boring bar is withdrawn; and depositing the second boring bar and support bushing on the tool cradle by actuating the axes drive to move the spindle and tool support translationally relative to the support frame, then causing the spindle to release the second boring bar.

32. A method for boring a long interrupted line bore using a line boring apparatus comprising a spindle supported on a support frame, a tool cradle supported adjacent the spindle, an axes drive operatively connected between the spindle and the support frame, the axes drive including a Y axis drive configured to move the spindle vertically relative to the support frame and including two independently controllable spaced-apart drive members connected between the spindle and the support frame, and a tool support disposed along a rotational spindle axis and supported on the support frame; the method including the steps of:

providing a workpiece having a first long interrupted line bore in a position adjacent the support frame, the workpiece being disposed on a side of the tool support axially opposite the spindle;

providing a first boring bar on the tool cradle, the first boring bar configured to bore the first long interrupted line bore in the workpiece;

retrieving the first boring bar from the tool cradle by moving the spindle and tool support translationally relative to the support frame, then actuating the spindle to engage and grasp the first boring bar;

actuating the axes drive to move the spindle, the first boring bar and the tool support translationally relative to the support frame to a position where the spindle axis is coaxially aligned with the first long interrupted line bore of the workpiece;

moving the first boring bar to a position supported in the tool support by actuating the axes drive to advance the spindle along the spindle axis relative to the tool support;

boring the first long interrupted line bore in the workpiece by rotating the first boring bar on the spindle axis and continuing to advance the first boring bar along the spindle axis, through the tool support and into the first long interrupted line bore of the workpiece; and during the boring step, tilting the spindle about a horizontal droop axis disposed perpendicular to the Z axis by differentially controlling the two independently controllable spaced-apart drive members of the Y axis drive to compensate for increasing boring bar droop as the boring bar protrudes further from the tool support during boring.

\* \* \* \* \*